US008867856B2

(12) United States Patent
Wang et al.

(10) Patent No.: US 8,867,856 B2
(45) Date of Patent: Oct. 21, 2014

(54) DE-NOISING IMAGE CONTENT USING DIRECTIONAL FILTERS FOR IMAGE DE-BLURRING

(71) Applicant: Adobe Systems Incorporated, San Jose, CA (US)

(72) Inventors: Jue Wang, Kenmore, WA (US); Sunghyun Cho, Seattle, WA (US); Lin Zhong, Somerset, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 93 days.

(21) Appl. No.: 13/674,263

(22) Filed: Nov. 12, 2012

(65) Prior Publication Data

US 2014/0133775 A1 May 15, 2014

(51) Int. Cl.
*G06K 9/40* (2006.01)
*G06T 5/00* (2006.01)

(52) U.S. Cl.
CPC .................................... *G06T 5/003* (2013.01)
USPC .......................... 382/254; 382/263; 382/255

(58) Field of Classification Search
None
See application file for complete search history.

(56) References Cited

U.S. PATENT DOCUMENTS

| 8,411,980 | B1 * | 4/2013 | Wang et al. ................... 382/254 |
| 2004/0193670 | A1 * | 9/2004 | Langan et al. ................ 708/819 |
| 2010/0166332 | A1 * | 7/2010 | Lee et al. ..................... 382/255 |
| 2011/0096180 | A1 * | 4/2011 | McCloskey et al. ....... 348/208.4 |
| 2011/0102642 | A1 * | 5/2011 | Wang et al. ................... 348/241 |
| 2011/0254983 | A1 * | 10/2011 | Siddiqui et al. .............. 348/241 |
| 2012/0281872 | A1 * | 11/2012 | Zitnick, Iii .................... 382/103 |
| 2013/0058587 | A1 * | 3/2013 | Wang et al. ................... 382/255 |
| 2013/0058588 | A1 * | 3/2013 | Wang et al. ................... 382/255 |
| 2013/0343669 | A1 * | 12/2013 | Fattal et al. ................... 382/255 |

OTHER PUBLICATIONS

Cai, Jian-Feng, et al. "Blind motion deblurring from a single image using sparse approximation." Computer Vision and Pattern Recognition, 2009. CVPR 2009. IEEE Conference on. IEEE, 2009.*
Sun, Hongwei, et al. "Motion blur parameters identification from radon transform image gradients." Industrial Electronics, 2009. IECON'09. 35th Annual Conference of IEEE. IEEE, 2009.*
Buades et al., "A non-local algorithm for image denoising", CVPR, 2005, 1-6.
Cai et al., "High-quality curvelet-based motion deblurring from an image pair", CVPR, 2009, 1-8.
Cho et al., "Blur kernel estimation using the radon transform", CVPR, 2011, 241-248.
Cho et al., "Fast motion deblurring", SIGGRAPH Asia, 2009, 1-8.

(Continued)

*Primary Examiner* — Li Liu
(74) *Attorney, Agent, or Firm* — Kilpatrick Townsend & Stockton LLP

(57) ABSTRACT

Systems and methods are provided for providing improved de-noising image content by using directional noise filters to accurately estimate a blur kernel from a noisy blurry image. In one embodiment, an image manipulation application applies multiple directional noise filters to an input image to generate multiple filtered images. Each of the directional noise filters has a different orientation with respect to the input image. The image manipulation application determines multiple two-dimensional blur kernels from the respective filtered images. The image manipulation application generates a two-two-dimensional blur kernel for the input image from the two-dimensional blur kernels for the filtered images. The image manipulation application generates a de-blurred version of the input image by executing a de-blurring algorithm based on the two-dimensional blur kernel for the input image.

17 Claims, 9 Drawing Sheets

(56) References Cited

OTHER PUBLICATIONS

Dabov et al., "Image denoising by sparse 3d transform-domain collaborative filtering", IEEE Transactions on Image Processing, 2007, 16(8) 1-16.

Fergus et al., "Removing camera shake from a single photograph", SIGGRAPH, 2006, 1-8.

Joshi et al., "Psf estimation using sharp edge prediction", CVPR, 2008, 1-8.

Kim, "Numerical Optimization Methods for Image Restoration", PhD thesis, Stanford University, 2002, 1-102.

Levin et al., "Efficient marginal likelihood optimization in blind deconvolution", CVPR, 2011, 1-8.

Levin et al., "Understanding and evaluating blind deconvolution algorithms", CVPR, 2009, 1-8.

Shan et al., "High-quality motion deblurring from a single image", ACM Transactions on Graphics, 27(3) Article 73, 2008, 1-10.

Tai et al., "Motion-aware noise filtering for deblurring of noisy and blurry images", CVPR, 2012, 1-8.

Tomasi et al., "Bilateral filtering for gray and color images", Proceedings of the IEEE Intl Conference on Computer Vision, Bombay, India, 1998, 1-8.

Xu et al., "Two-phase kernel estimation for robust motion deblurring", ECCV, 2010, 157-170.

* cited by examiner

DE-NOISING IMAGE CONTENT USING DIRECTIONAL FILTERS FOR IMAGE DE-BLURRING

TECHNICAL FIELD

This disclosure relates generally to computer-implemented methods and systems and more particularly relates to de-noising image content using directional filters.

BACKGROUND

Image manipulation programs are used to modify or otherwise use image content captured using a camera. For example, an image manipulation program can remove or decrease noise from (i.e., de-noise) image content captured using the camera. An image manipulation program can also remove or decrease blurring in image content captured using the camera.

Noise and blurring can be caused by, for example, capturing images in low light conditions with low-end cameras.

Low-end cameras may increase the amount of exposure time used for recording an image. Increasing the amount of exposure time used for recording an image can increase the amount of camera shake during the recording of an image. Increasing camera shake introduces blurring into the image content as recorded by the camera. For example, as depicted in FIG. 1, an image 10 may be blurred as a result of shaking of the camera used to capture the image 10. The blurring may manifest by including objects 12a, 12b that are overlapping and offset from one another. Each of objects 12a, 12b is a separate image of a single object captured during a long exposure time.

Low-end cameras may include image sensors having a high sensitivity to light conditions. Increasing the sensitivity to light conditions can add noise to image content captured with the camera. For example, as depicted in FIG. 2, an image 10' may be blurred as a result of a camera shake and added noise. The blurring caused by a camera shake may manifest by including objects 12c, 12d that are overlapping and offset from one another. Each of objects 12c, 12d are separate images of a single object captured during a long exposure time. In addition, each of the objects 12c, 12d is distorted by the addition of noise to the image 10'. The noise added to image 10' can distort the objects 12c, 12d in different ways, thereby complicating the process of removing distortion from the image 10'.

Existing solutions for de-noising image content can improve the quality of image content having a very small amount of noise. However, the performance of existing solutions for de-noising image content is degraded for image content having increased noise levels. For example, noise in excess of 5% can cause existing de-noising solutions to destroy or otherwise corrupt blur information when used to remove noise from an image. Increasing the level of noise in image content thus prevents existing solutions from reliably estimating a blur kernel. An inaccurate blur kernel can degrade the quality of a de-blurred image. Applying existing solutions for de-noising image for de-blurring can therefore degrade the quality of image content.

SUMMARY

One embodiment involves an image manipulation application applying multiple directional noise filters to an input image to generate multiple filtered images. Each of the directional noise filters has a different orientation with respect to the input image. The embodiment also involves the image manipulation application determining multiple two-dimensional blur kernels for the filtered images. Each of the two-dimensional blur kernels is determined for a respective filtered image. The embodiment also involves the image manipulation application generating a two-dimensional blur kernel for the input image from the two-dimensional blur kernels for the filtered images. The embodiment also involves generating, by the image manipulation application, a de-blurred version of the input image by executing a de-blurring algorithm based on the two-dimensional blur kernel for the input image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
FIG. 1 is a photograph illustrating image content distorted by movement of an imaging device during image capture.
Figure 2:
FIG. 2 is a photograph illustrating image content distorted by movement of an imaging device during image capture and noise added to the image content.

Computer-implemented systems and methods are disclosed for providing improved de-noising of image content by using directional noise filters to accurately estimate a blur kernel from a noisy and blurry image. For example, a blur kernel can be estimated from a blurred input image. The blur kernel can mathematically describe or otherwise represent the motion and/or trajectory of the camera capturing an image, thereby providing a description of how the image was blurred. The quality of the blur kernel can be negatively impacted by noise in the image. An image manipulation application can remove or minimize the effect of noise in estimating the blur kernel by applying a series of directional noise filters to the noisy input image. Each directional noise filter can be applied to the input image in a different direction to generate a respective filtered image. For each filtered image, the respective noise filter remove noise from the input image in the direction of the respective noise filter and preserve the blur information in a direction that is orthogonal to the respective noise filter. The preserved blur information can provide a one-dimensional projection for each image that describes or represents the movement of the camera in a direction orthogonal to the noise filter (i.e., in camera movement in one dimension). The group of one-dimensional projections can be used to generate an estimated two-dimensional blur kernel describing or representing the movement of the camera in multiple directions (i.e., camera movement in two dimensions). The estimated two-dimensional blur kernel is equivalent to a kernel generated from a clean version of the input image (i.e., a version of the input image without any noise). The image manipulation application can de-blur the input image using the estimated blur kernel. Using directional noise filters to accurately estimate a blur kernel from a noisy blurry image can remove noise from a blurry image without destroying or significantly degrading blur information used by an image manipulation application to de-blur the image.

In accordance with one embodiment, an image manipulation application applies multiple directional noise filters to an input image to generate multiple filtered images. Each of the directional noise filters has a different orientation with respect to the input image. A directional noise filter can reduce noise and maintain blur information in a direction orthogonal to the orientation of the noise filter. The image manipulation application determines multiple two-dimensional blur kernels from the respective filtered images. A two-dimensional blur kernel can be represented by a blur profile in a given direction. The image manipulation application generates a two-dimensional blur kernel for the input image from the group of two-dimensional blur kernels for the filtered images. For example, the image manipulation application can generate a point spread function ("PSF") from the blue profiles for the multiple filtered images using an inverse Radon transform. A Radon transform is an integral transform representing an image. The image manipulation application generates a de-blurred version of the input image by executing a de-blurring algorithm based on the two-dimensional blur kernel for the input image.

As used herein, the term "image content" is used to refer to any image that can be rendered for display or use at a computing system or other electronic device. Image content can include still images, video, or any combination thereof.

As used herein, the term "blur kernel" is used to refer to data representing or otherwise describing the movement of a camera or other imaging device during the recording of image content. The blur kernel can represent or otherwise describe blurring of image content resulting from a camera shake. A non-limiting example of a blur kernel is a point spread function ("PSF") describing the relationship between latent image content and the camera shake blurring the latent image content.

As used herein, the term "latent image" is used to refer to image content without blurring and/or noise or to image content for which blurring and/or noise has been reduced or eliminated.

As used herein, the term "noise" is used to refer to random data added to or otherwise altering image content to distort the image content. Noise can be added to image content due to thermal noise or other noise experienced by the optical sensor of an imaging device, such as a camera.

In additional or alternative embodiments, a two-dimensional blur kernel for the input image can be estimated using an image pyramid for a blurred input image. The image pyramid includes a set of copies of the input image. The image copies include an original-resolution image copy and multiple reduced-resolution copies. The original-resolution image copy is a copy of the blurred image having the original resolution of the blurred image as captured by a camera or other imaging device. Each of the reduced-resolution copies has a sequentially decreasing resolution. Decreasing the resolution of the reduced-resolution image copies can remove the effect of noise on the content of the original-resolution image copy, as the features distorted by noise in the original-resolution copy are obscured by decreasing the resolution of the input image. The image manipulation application can determine a corresponding reduced-resolution blur kernel and reduced-resolution latent image for each of the reduced-resolution image copies. The image manipulation application can generate an interim latent image corresponding to the original-resolution image copy by up-sampling a reduced-resolution latent image having the highest resolution. The interim latent image generated by up-sampling the reduced-resolution latent image can be used in an iterative process for estimating the blur kernel. The image manipulation application can apply an iterative process that involves applying multiple directional noise filters to the original input image to generate multiple filtered images, estimating two-dimensional blur kernels for the filtered images using the interim latent image, generating a two-dimensional blur kernel for the input image from the two-dimensional blur kernels for the filtered images, and updating the interim latent image based on the two-dimensional blur kernel for the input image. The image manipulation application can cease iteration based on the two-dimensional blur kernel for the input image converging to a stable value.

In additional or alternative embodiments, the image manipulation application can use noise-aware non-blind de-convolution to generate a de-blurred version of an input image. The image manipulation application can provide a blurred input image, an interim latent image, and a two-dimensional blur kernel for the blurred input image to an energy function. The energy function can be a function modeling the relationship between a latent image, a blur kernel, and a blurred input image. The energy function can describe one or more images using image pixel values as one or more inputs to the function. Image content can be defined as individual energy terms in the energy function. The energy function can measure how well pixel values in one or more images satisfy a pre-defined expectations for the image content. The energy function can include a non-local means de-noising operation applied to the interim latent image. The image manipulation application can modify the energy function to include an approximation image as an input to the non-local means de-noising operation, thereby minimizing the effect of the non-local means de-noising operation. The approximation image can represent a noise-free version of the interim latent image. The image manipulation application can minimize the energy function by iteratively modifying pixel values for the approximation image and the interim latent image. The image manipulation application can cease iteration based on a stable value for the latent image being generated.

Figure 3:
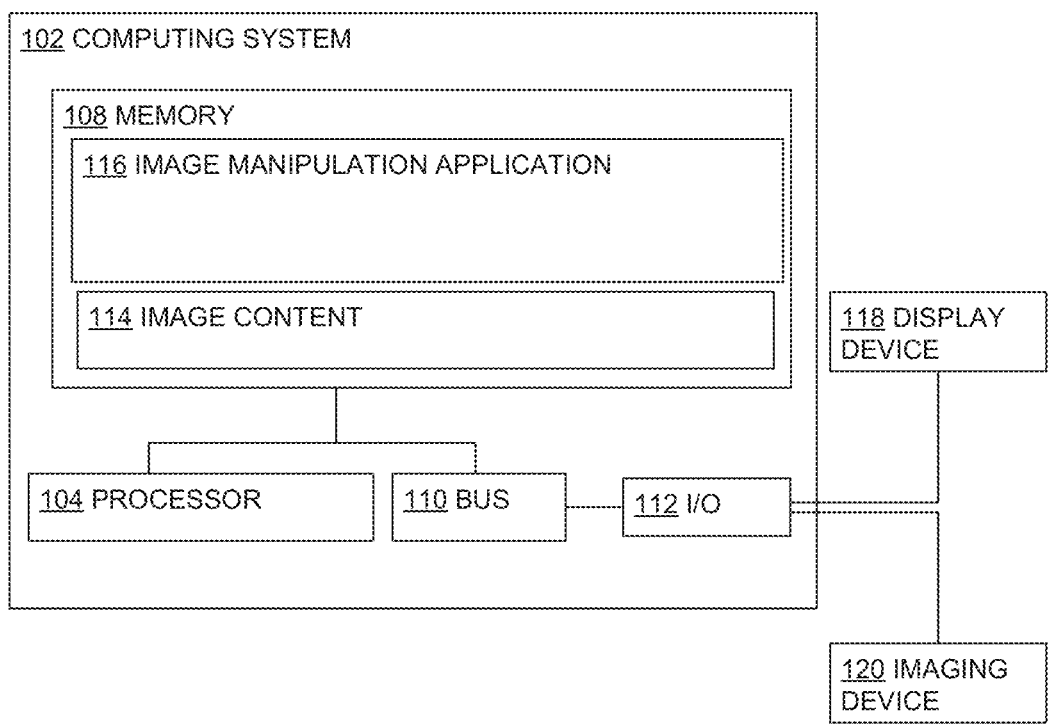
FIG. 3 is a block diagram depicting an example computing system for implementing certain embodiments.

Referring now to the drawings, FIG. 3 is a block diagram depicting an example computing system 102 for implementing certain embodiments.

The computing system 102 comprises a computer-readable medium such as a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, can cause the processor to perform the steps described herein.

The computing system 102 may also comprise a number of external or internal devices such as input or output devices. For example, the computing system 102 is shown with an input/output ("I/O") interface 112, a display device 118, and an imaging device 120. A bus 110 can also be included in the computing system 102. The bus 110 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 108 at the computing system 102. In another embodiment, the image content 114 can be accessed by the computing system 102 from a remote content provider via a data network.

A non-limiting example of an imaging device 120 is a camera having an energy source, such as a light emitting diode ("LED"), and an optical sensor. An imaging device 120 can include other optical components, such as an imaging lens, imaging window, an infrared filter, and an LED lens or window. In some embodiments, the imaging device 120 can be a separate device configured to communicate with the computing system 102 via the I/O interface 112. In other embodiments, the imaging device 120 can be integrated with the computing system 102. In some embodiments, the processor 104 can cause the computing system 102 to copy or transfer image content 114 from memory of the imaging device 120 to the memory 108. In other embodiments, the processor 104 can additionally or alternatively cause the computing system 102 to receive image content 114 captured by the imaging device 120 and store the image content 114 to the memory 108.

An image manipulation application 116 stored in the memory 108 can configure the processor 104 to render the image content 114 for display at the display device 118. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 102 can include any suitable computing device for executing the image manipulation application 116. Non-limiting examples of a computing device include a desktop computer, a tablet computer, a smart phone, a digital camera, or any other computing device suitable for rendering the image content 114.

Figure 4:
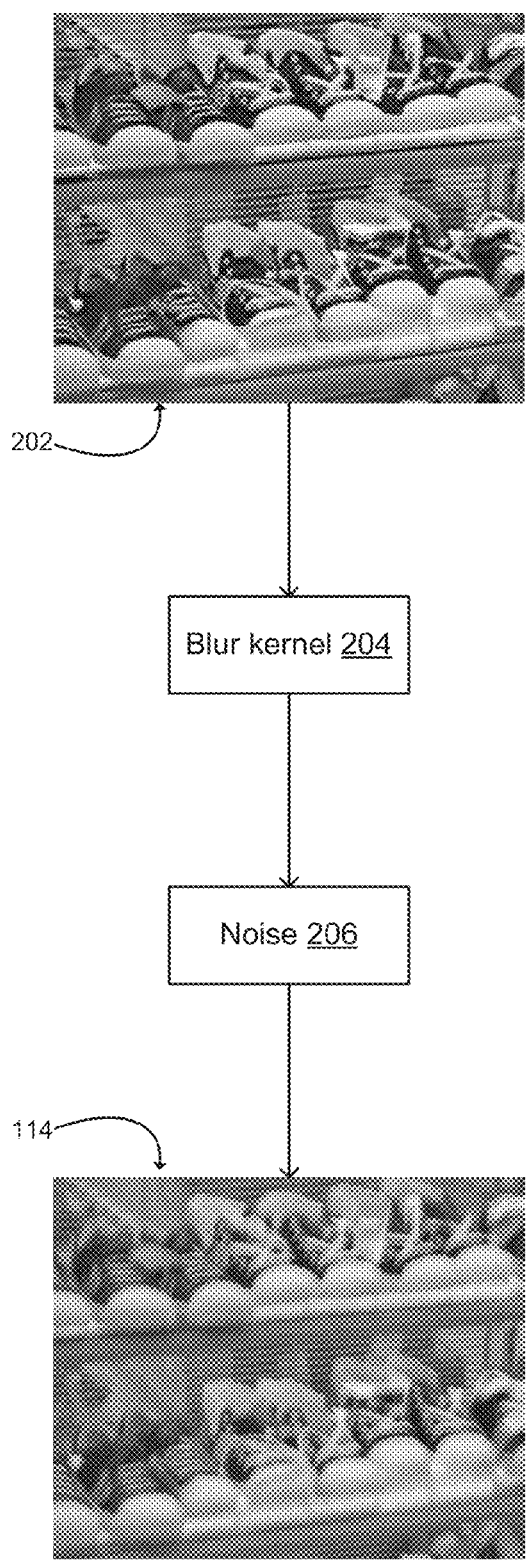
FIG. 4 is a modeling diagram illustrating a latent image being distorted by the application of a blur kernel and noise to generate distorted image content.

The distorted image content 114 by an imaging device can be modeled as a latent image being distorted by both noise and blurring. FIG. 4 is a modeling diagram illustrating a latent image 202 being distorted by the application of a blur kernel 204 and noise 206 to generate distorted image content 114.

In single image de-blurring, blurry and noisy input image content 114 can be modeled by the function $$b = l * k + n,$$

where a blurred input image b is the distorted image content 114 after convolving a latent image l with a blur kernel k and adding noise n.

One solution for de-blurring an image b is to estimate a kernel k using the function $$k = \arg\min_k (\|b - k * l\|^2 + \rho_k),$$

where $\rho_k$ is an additional regularization term that provides smoothness and/or sparsity for the kernel k. In the absence of the regularization term $\rho_k$, estimating the blur kernel k can be determined using a least squares algorithm. For example, the kernel k can be estimated by solving a linear function such as $$L^T L \vec{k} = L \vec{b} = L(\vec{k} + \vec{b}'),$$

where $\vec{k}$ and $\vec{b}$ represent vectors respectively corresponding to the kernel k and the blurred image b and L represents a matrix corresponding to the latent image l. The relative error of the kernel $\vec{k}$ to the noise $\vec{n}$ in the blurred image $\vec{b}$ can be determined from the function $$\frac{e(\vec{k})}{e(\vec{b})} = \frac{\|(L^T L)^{-1} L^T \vec{n}\| / \|(L^T L)^{-1} L^T \vec{b}\|}{\|L^T \vec{n}\| / \|L^T \vec{b}\|} \leq \|(L^T L)\| \cdot \|(L^T L)^{-1}\| = x(L^T L)$$

where $L^T L$ represents a de-convolution matrix and $x(L^T L)$ represents the condition number for the kernel estimation. The de-convolution matrix $L^T L$ can include a block-circulant-with-circulant-block ("BCCB") structure. The condition number $x(L^T L)$ can be determined by content of the blurred image $\vec{b}$. The noise $\vec{n}$ in the blurred image $\vec{b}$ is amplified by the condition number $x(L^T L)$. For example, images having edges that are more salient at different directions can have lower condition numbers and images having fewer salient edges can have higher numbers. As a result, different images 202 that are synthetically blurred by the same blur kernel 204 with the same amount of added noise 206 can include different amounts of noise.

Additive noise 206 of five percent or more can be sufficient to increase the difficulty of estimating the blur kernel k for a noisy image b. An effective process for removing or reducing noise 206 for de-blurring of an image 202 can remove the noise 206 and preserve the image content of the image 202. Preserving the image content of the image 202 can include preserving the profiles of strong edges for objects in an image 202. De-blurring algorithms can estimate a kernel 204 using the profiles for strong edges of objects in an image 202.

Figure 5:
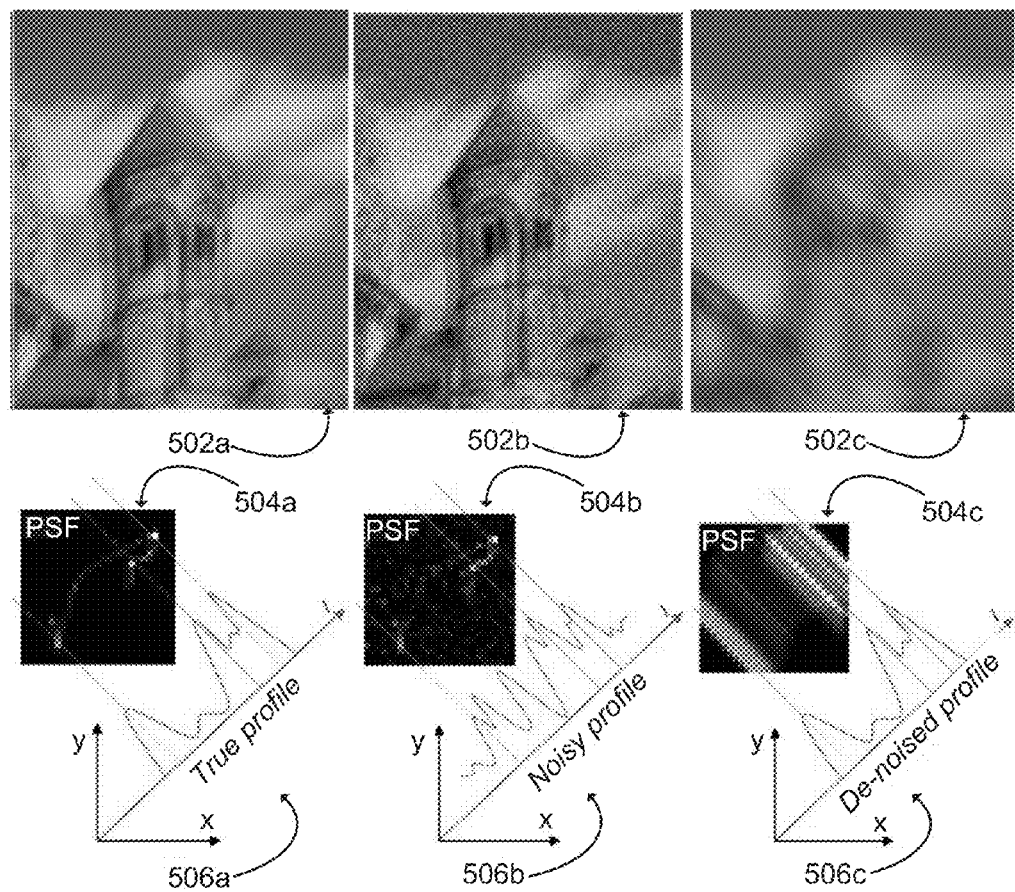
FIG. 5 is a modeling diagram depicting the application of a directional de-noising process to an image.

FIG. 5 is a modeling diagram depicting the application of a directional de-noising process to an image 10.

Image 502a is an image without added noise. Image 502b is the image 502a with added noise.

Image 502c is the image 502b as processed by a directional noise filter. The directional noise filter can be applied along a line in having a given angle or rotation with respect to the image 502b. The directional noise filter can average pixels along the line. For example, as depicted in FIG. 5, a directional noise filter is applied to image 502b at a 45-degree angle. Averaging the pixels along the line of the directional noise filter can blur the image 504b to generate the image 502c.

A non-limiting example of a directional noise filter is a directional low-pass filter. A directional low-pass filter $f_\theta$ can be represented by the function $$f_\theta(I, p) = \frac{1}{c} \int_{-\infty}^{\infty} w(t) I(N_\theta(p, t)) dt$$

where I is an image, p is a pixel location, c is a normalization factor, $N_\theta(p, t)$ is a pixel location at a distance from the pixel location p, w(t) is a Gaussian function for determining the profile of the directional low-pass filter $f_\theta$. The normalization factor c can be determined from the function $$c = \int_{-\infty}^{\infty} w(t) dt$$

$$c = \int_{-\infty}^{\infty} w(t) dt$$

A spatial distance between the pixel location p and the pixel location $N_\theta(p, t)$ can be a distance t on a line represented by the function $$N_\theta(p, t) = p + t \cdot \left(\frac{\cos\theta}{\sin\theta}\right).$$

An example of the Gaussian function w(t) is $$w(t) = \exp\left(-\frac{|t|}{\sigma_f}\right)$$

where $\sigma_f$ can determine the strength of the filter. The directional low-pass filter can reduce image noise by averaging pixel values along a line.

The image manipulation application 116 can apply the directional low-pass filter $f_\theta$ to a blurred image b, as represented by the function $$b_\theta = b * f_\theta(\Delta),$$

where $b_\theta$ represents a filtered image and $\Delta$ represents a delta image. The center pixel for the delta image $\Delta$ has a pixel value of one. All other pixels for the delta image $\Delta$ have pixel values of zero. A kernel $k_\theta$ estimated from a filtered image $b_\theta$ be represented by the function $$k_\theta = k * f_\theta(\Delta).$$

The estimated kernel $k_\theta$ determined by the image manipulation application 116 is different from the actual blur kernel k that describes the motion of an imaging device 120 capturing the blurred image b.

Kernels 504a-c are the corresponding estimated blur kernels for the images 502a-c. Blur profiles 506a-c depict the corresponding Radon transforms for the kernels 504a-c.

A Radon transform $R_{\theta'}$ of the kernel k in the same direction as the directional low-pass filter $f_\theta$ can be represented by the function $$R_{\theta'}(k_\theta) = R_{\theta'}(k * f_\theta(\Delta)) = R_{\theta'}(k) * R_{\theta'}(f_\theta(\Delta)) = R_{\theta'}(k)$$

where $R_{\theta'}(x)$ is the Radon transform operator in a direction $\theta'$ and $\theta' = \theta + \pi/2$. Thus, the Radon transform $R_{\theta'}(k_\theta)$ for the estimated kernel $k_\theta$ can be similar or equal to the Radon transformation $R_{\theta'}(k)$ for the actual kernel k.

The Radon transform operator $R_{\theta'}(x)$ is a linear operator. $R_{\theta'}(f_\theta(\Delta))$ is a one-dimensional delta function for the values of the directional low-pass filter $f_\theta$ and the delta image $\Delta$ described above. The directional low-pass filter $f_\theta$ can be applied without impacting the Radon transform of the blur kernel k along the same direction of the directional low-pass filter $f_\theta$.

The estimated kernel 504c is damaged by applying a directional noise filter to the image 502b to obtain the image 502c. The Radon transform for the image 502c is largely unaffected by application of the directional noise filter. The Radon transform for the image 502c is the same as or similar to the Radon transform for the image 502a. For example, any accumulated pixels are in the same direction as the directional noise filter used to generate the image 502c.

Figure 6:
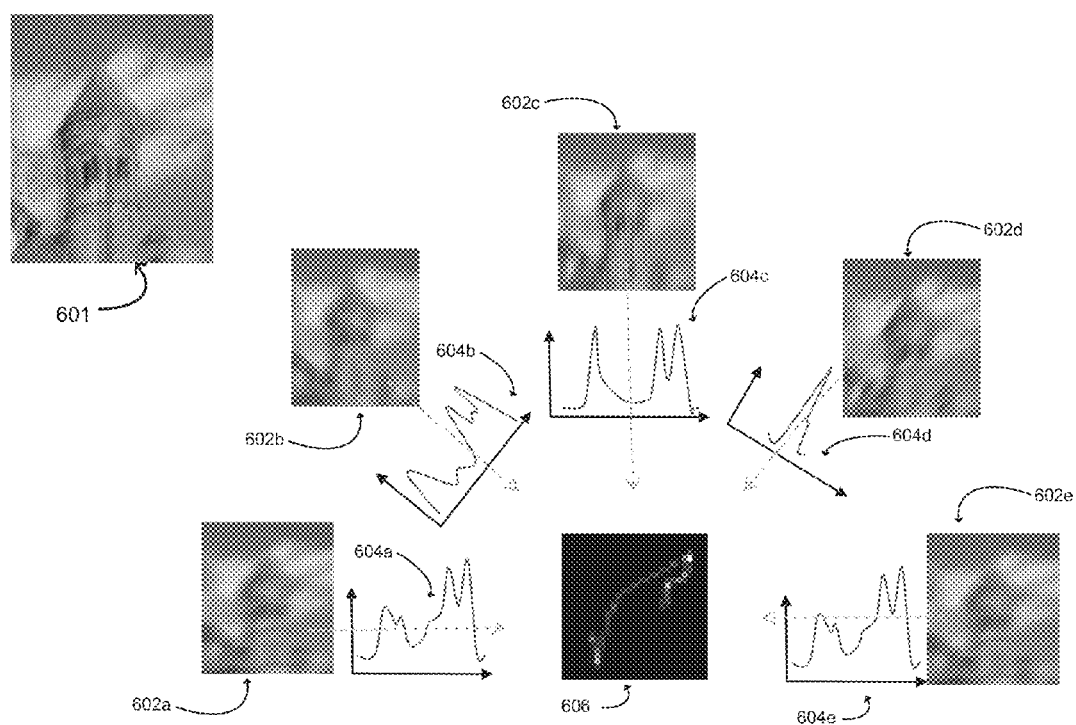
FIG. 6 is a modeling diagram depicting the application of directional noise filters to an input image to generate filtered images and corresponding blur profiles representing two-dimensional blur kernels for the filtered images.

FIG. 6 is a modeling diagram depicting the application of directional noise filters to an input image 601 to generate filtered images 602a-c and the corresponding blur profiles 604a-e representing one-dimensional projections for the filtered images 602a-c.

For each directional noise filter, a one-dimensional projections is obtained. The one-dimensional projections can be combined to obtain a reconstructed blur kernel from the multiple one-dimensional projections. The directional noise filter can affect the blur kernel in all other directions in projections of all other directions except the direction of the directional noise filter. A one-dimensional projection generated from a filtered image can be used to provide an accurate blur profile for use in de-blurring an image. A two-dimensional blur kernel can be reconstructed by using multiple one-dimensional projections generated using directional noise filters applied to an image in multiple directions.

The image 601 is a blurred input image having an additive noise value of 5%. The image manipulation application 116 can apply directional noise filters in multiple directions to obtain the filtered images 602a-c. The image manipulation application 116 can estimate or otherwise determine the blur profiles 604a-e respectively corresponding to the filtered images 602a-e. The image manipulation application 116 can project each two-dimensional blur kernel represented by one of the blur profiles 604a-e to a corresponding orthogonal direction to generate a correct Radon transform for the respective one-dimensional projection. The image manipulation application 116 can reconstruct or otherwise generate a two-dimensional blur kernel 606 from the one-dimensional projections. The image manipulation application 116 can apply an inverse Radon transformation to generate the two-dimensional blur kernel 606. The two-dimensional blur kernel 606 is represented using a point-spread function.

Figure 7:
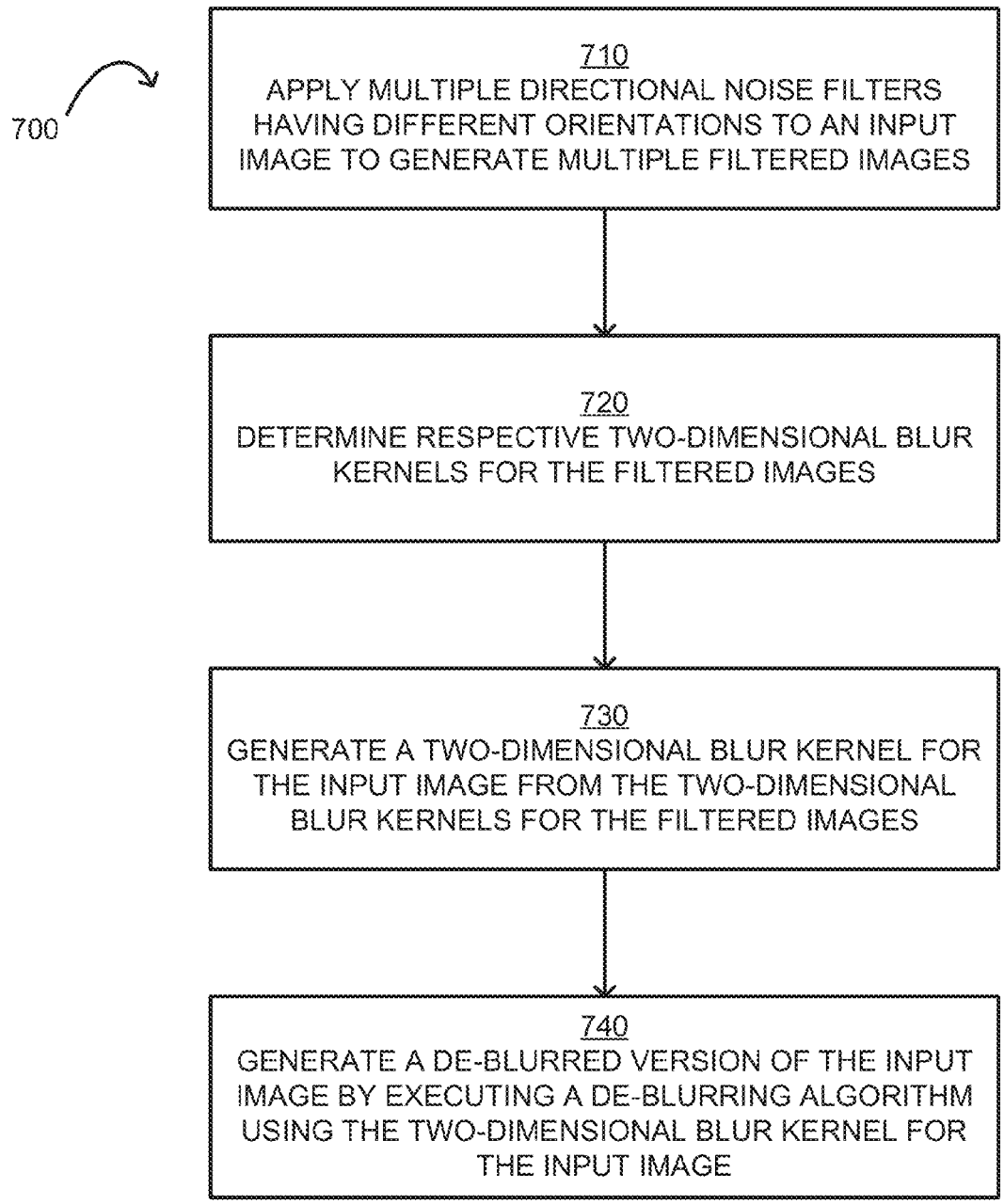
FIG. 7 is a flow chart illustrating an example method for de-noising image content by using directional noise filters to accurately estimate a blur kernel from a noisy blurry image.

FIG. 7 is a flow chart illustrating an example method 700 for de-noising image content by using directional noise filters to accurately estimate a blur kernel from a noisy blurry image. For illustrative purposes, the method 700 is described with reference to the system implementation depicted in FIG. 3. Other implementations, however, are possible.

The method 700 involves applying multiple directional noise filters to an input image to generate multiple filtered images, as shown in block 710. Each of the directional noise filters has a different orientation with respect to the input image. The processor 104 of the computing system 102 can execute the image manipulation application 116 to apply multiple directional noise filters to an input image. For example, the image manipulation application 116 can apply $N_f$ directional noise filters to a blurred image b to generate multiple filtered images $b_\theta$. Each directional noise filter can have a direction of $i \cdot N_f/\pi$ for $i=1, \ldots, N_f$.

The method 700 further involves determining multiple two-dimensional blur kernels for the filtered images, as shown in block 720. Each two-dimensional blur kernel is determined for a respective filtered image. The processor 104 of the computing system 102 can execute the image manipulation application 116 to determine the two-dimensional blur kernels for the filtered images.

The image manipulation application 116 can apply any suitable method for determining the two-dimensional blur kernels for the filtered images. For example, the image manipulation application 116 can estimate each two-dimensional blur kernel $k_\theta$ by executing the function $$k_\theta = \underset{k_\theta}{\mathrm{argmin}}(\|\nabla b_\theta - k_\theta * \nabla l_{0,interim}\|^2 + \rho_{k_\theta})$$

where $\nabla$ is a gradient operator, $b_\theta$ is the respective filtered image, $l_{0,interim}$ is the interim latent image, and $\rho_{k_\theta}$ is an additional regularization term that provides smoothness and/or sparsity for the two-dimensional blur kernel $k_\theta$.

The method 700 further involves generating a two-dimensional blur kernel for the input image from the two-dimensional blur kernels of the filtered images, as shown in block 730. The processor 104 of the computing system 102 can execute the image manipulation application 116 to generate the two-dimensional blur kernel from the two-dimensional blur kernels.

The image manipulation application 116 generates the two-dimensional blur kernel using any suitable method. For example, the image manipulation application 116 can determine a respective Radon transform for each of the two-dimensional blur kernels for the filtered images. The image manipulation application 116 can determine each Radon transform $R_{\theta'}(k_\theta)$ for a respective two-dimensional blur kernel $k_\theta$ by executing the function $$R_{\theta'}(k_\theta) = R_{\theta'}(k * f_\theta(\Delta)) = R_{\theta'}(k) * R_{\theta'}(f_\theta(\Delta)) = R_{\theta'}(k)$$

where $R_{\theta'}(x)$ is the Radon transform operator in a direction $\theta'$ and $\theta' = \theta + \pi/2$.

The image manipulation application 116 can generate a two-dimensional blur kernel from the multiple Radon transforms of the multiple two-dimensional blur kernels of the filtered images. For example, the image manipulation application 116 can generate a two-dimensional blur kernel $k_0$ by applying an inverse Radon transformation of the Radon transforms for the multiple two-dimensional blur kernels $k_\theta$.

The method 700 further involves generating a de-blurred version of the input image by executing a de-blurring algorithm based on the two-dimensional blur kernel, as shown in block 740. The processor 104 of the computing system 102 can execute the image manipulation application 116 to execute a de-blurring algorithm using a two-dimensional blur kernel $k_0$. The image manipulation application 116 can generate a de-blurred version of the input image via any suitable de-blurring algorithm.

One non-limiting example of generating a de-blurred version of the input image is to apply a noise-aware non-blind de-convolution method to the input image, as described in more detail with respect to FIG. 9 below.

Figure 8:
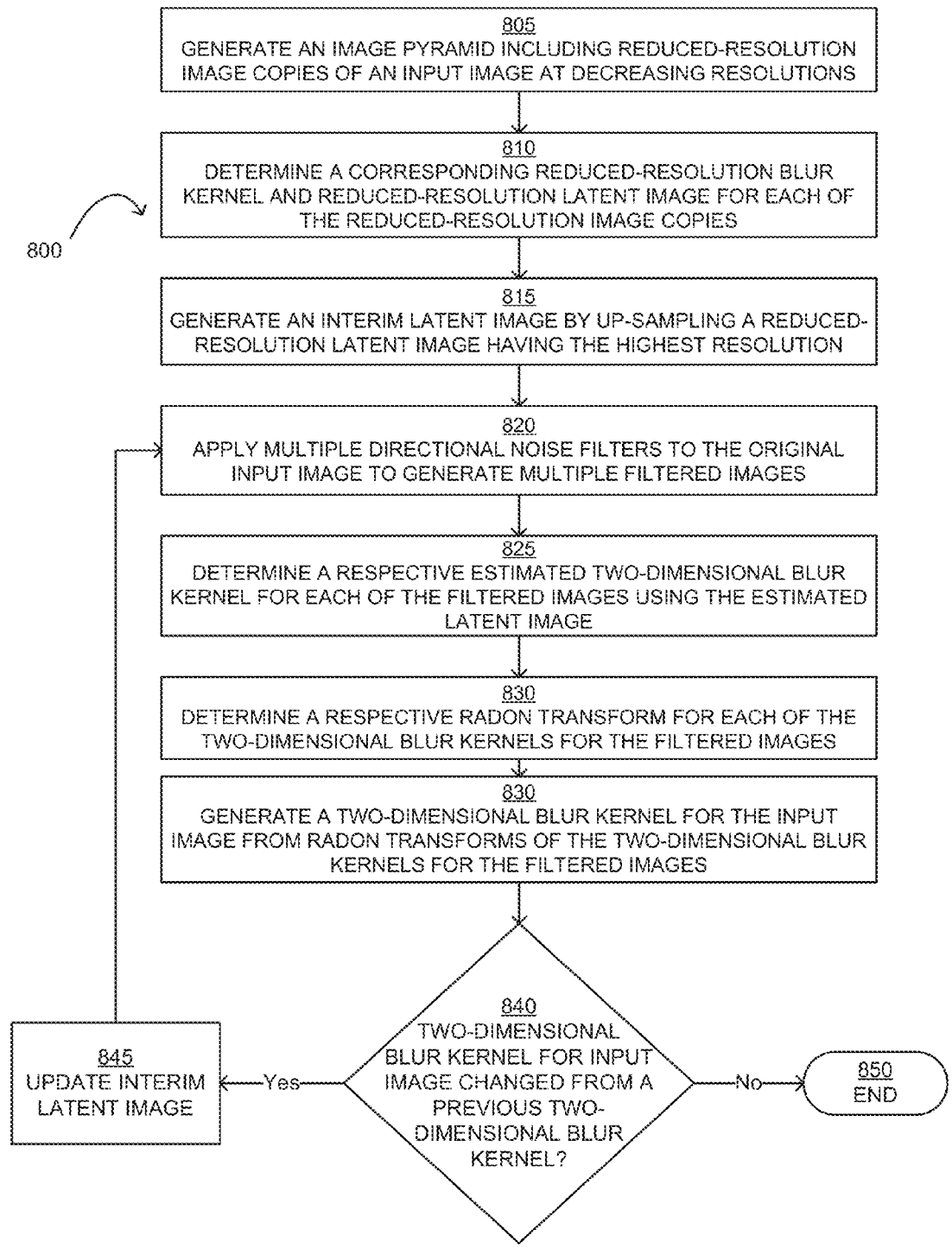
FIG. 8 is a flow chart illustrating an example method for generating a two-dimensional blur kernel for use with a de-blurring algorithm.

FIG. 8 is a flow chart illustrating an example method 800 for generating a two-dimensional blur kernel for use with a de-blurring algorithm, such as a noise-aware non-blind de-convolution. For illustrative purposes, the method 800 is described with reference to the system implementation depicted in FIG. 3. Other implementations, however, are possible.

The method 800 involves generating an image pyramid including image copies of an input image at decreasing resolutions, as shown in block 805. The processor 104 of the computing system 102 can execute the image manipulation application 116 to generate an image pyramid from an input image, such as a blurred image b.

The image pyramid includes a set of image copies $\{b_0, b_1, \ldots, b_n\}$. The image copy $b_0$ is a copy of the blurred image b having the original resolution of the blurred image b as captured by the imaging device 120. Each of the image copies $b_1, \ldots, b_n$ is a reduced-resolution image copy of the input image b with respect to the resolution of the blurred image b as captured by the imaging device 120. The resolutions for the reduced-resolution image copies $b_1, \ldots, b_n$ decrease sequentially. The reduced-resolution image copy $b_1$ has the highest resolution of the reduced-resolution image copies $b_1, \ldots, b_n$. The image copy $b_n$ has the lowest resolution of the reduced-resolution image copies $b_1, \ldots, b_n$. Decreasing the resolution of the image copies $b_1, \ldots b_n$ can remove noise included in the image copy $b_0$ at the original resolution as captured by the imaging device 120.

The method 800 further involves determining, for each of the reduced-resolution image copies, a corresponding reduced-resolution blur kernel and reduced-resolution latent image, as shown in block 810. The processor 104 of the computing system 102 can execute the image manipulation application 116 to determine the reduced-resolution blur kernels $k_1, \ldots k_n$ corresponding to the reduced-resolution image copies $b_1, \ldots b_n$. The image manipulation application 116 can use the use the reduced-resolution blur kernels $k_1, \ldots k_n$ to determine the reduced-resolution latent images $l_1, \ldots l_n$ corresponding to the reduced-resolution image copies $b_1, \ldots b_n$. The image manipulation application 116 can estimate the reduced-resolution blur kernels $k_1, \ldots k_n$ and determine the reduced-resolution latent images $l_1, \ldots l_n$ using any suitable method. A non-limiting example of a suitable method is provided in S. Cho and S. Lee, *Fast Motion Deblurring*, SIGGRAPH ASIA, 2009.

The method 800 further involves generating an interim latent image by up-sampling a reduced-resolution latent image having the highest resolution, as shown in block 815. The processor 104 of the computing system 102 can execute the image manipulation application 116 to up-sample the reduced-resolution latent image having the highest resolution. For example, the image manipulation application 116 can generate an interim latent image $l_{0,interim}$ by up-sampling the reduced-resolution latent image $l_1$ having the highest resolution from the set of reduced-resolution latent images $l_1, \ldots l_n$.

The method 800 further involves applying multiple directional noise filters to the original input image to generate multiple filtered images, as shown in block 820. The processor 104 of the computing system 102 can execute the image manipulation application 116 to apply multiple directional noise filters to an input image. For example, the image manipulation application 116 can apply $N_f$ directional noise filters to a blurred image b to generate multiple filtered images $b_\theta$. Each directional noise filter can have a direction of $i \cdot N_f/\pi$ for $i=1, \ldots, N_f$.

The method 800 further involves determining a respective estimated two-dimensional blur kernel for each of the filtered images using the estimated latent image, as shown in block 825. The processor 104 of the computing system 102 can execute the image manipulation application 116 to determine the two-dimensional blur kernels for the filtered images.

The image manipulation application 116 can apply any suitable method for determining the two-dimensional blur kernels for the filtered images. For example, the image manipulation application 116 can estimate each two-dimensional blur kernel $k_\theta$ by executing the function $$k_\theta = \underset{k_\theta}{\mathrm{argmin}}(\|\nabla b_\theta - k_\theta * \nabla l_{0,interim}\|^2 + \rho_{k_\theta})$$

where $\nabla$ is a gradient operator, $b_\theta$ is the respective filtered image, $l_{0,interim}$ is the interim latent image, and $\rho_{k_\theta}$ is an additional regularization term that provides smoothness and/or sparsity for the two-dimensional blur kernel $k_\theta$.

The method 800 further involves determining a respective Radon transform for each of the two-dimensional blur kernels for the filtered images, as shown in block 830. The processor 104 of the computing system 102 can execute the image manipulation application 116 to determine the Radon transforms for the estimated two-dimensional blur kernels.

The image manipulation application 116 can apply any suitable method for determining the Radon transforms. For example, the image manipulation application 116 can determine each Radon transform $R_{\theta'}(k_\theta)$ for a respective two-dimensional blur kernel $k_\theta$ by executing the function $$R_{\theta'}(k_\theta)=R_{\theta'}(k*f_\theta(\Delta))=R_{\theta'}(k)*R_{\theta'}(f_\theta(\Delta))=R_{\theta'}(k)$$

where $R_{\theta'}(x)$ is the Radon transform operator in a direction $\theta'$ and $\theta'=\theta+\pi/2$.

The method 800 further involves generating a two-dimensional blur kernel for the input image from the multiple Radon transforms of the multiple two-dimensional blur kernels of the filtered images, as shown in block 835. The processor 104 of the computing system 102 can execute the image manipulation application 116 to generate the two-dimensional blur kernel for the input image. For example, the image manipulation application 116 can generate a two-dimensional blur kernel $k_0$ for the input image by applying an inverse Radon transformation of the Radon transforms for the multiple two-dimensional blur kernels $k_\theta$ of the filtered images.

The method 800 further involves determining if the two-dimensional blur kernel $k_0$ for the input image generated at block 835 has changed from a previous two-dimensional blur kernel $k_0$, as shown in block 840. The processor 104 of the computing system 102 can execute the image manipulation application 116 to determine if the two-dimensional blur kernel $k_0$ has changed from a previous two-dimensional blur kernel $k_0$.

If the two-dimensional blur kernel $k_0$ for the input image has changed from the previous two-dimensional blur kernel $k_0$, the method 800 further involves updating the interim latent image $l_{0,interim}$, as shown in block 845. The processor 104 of the computing system 102 can execute the image manipulation application 116 to update the interim latent image $l_{0,interim}$. The method 800 returns to block 820 to iteratively execute blocks 820, 825, 830, and 845.

The image manipulation application 116 can use any suitable method to update the interim latent image $l_{0,interim}$. For example, the image manipulation 116 can apply a noise-aware non-blind de-convolution method to update the interim latent image $l_{0,interim}$. The image manipulation 116 can update the interim latent image $l_{0,interim}$ by minimizing the energy function $$f_k(l_{0,interim})=\|\nabla l_{0,interim}*k_0-\nabla b_0\|^2+w_1\|\nabla l_{0,interim}-u(\nabla l_1)\|^2+w_2\|\nabla l_{0,interim}\|^2$$

where $b_0$ is the image having the original resolution of the blurred image b as captured by the imaging device 120, $u(x)$ represents an up-sampling function, $w_1$ is a first pre-defined weight, and $w_2$ is a second pre-defined weight. The term $\|\nabla l_{0,interim}-u(\nabla l_1)\|^2$ can cause the gradient of $l_{0,interim}$ to be similar to the up-sampled gradient for the reduced-resolution latent image $l_1$ having the highest resolution from the set of reduced-resolution latent images $l_1, \ldots l_n$. As discussed above, noise is removed from the image $l_1$ by decreasing the resolution of the image copy $b_1$ used to generate the image $l_1$. Including the term $\|\nabla l_{0,interim}-u(\nabla l_1)\|^2$ can reduce the noise level for the updated interim latent image $l_{0,interim}$.

If the two-dimensional blur kernel for the input image has not changed from (i.e., has converged with) one or more previously determined two-dimensional blur kernels for the input image, the method 800 terminates, as shown in block 850. The image manipulation application 116 can apply a de-blurring operation to the input image based on the two-dimensional blur kernel determined from the method 800.

Figure 9:
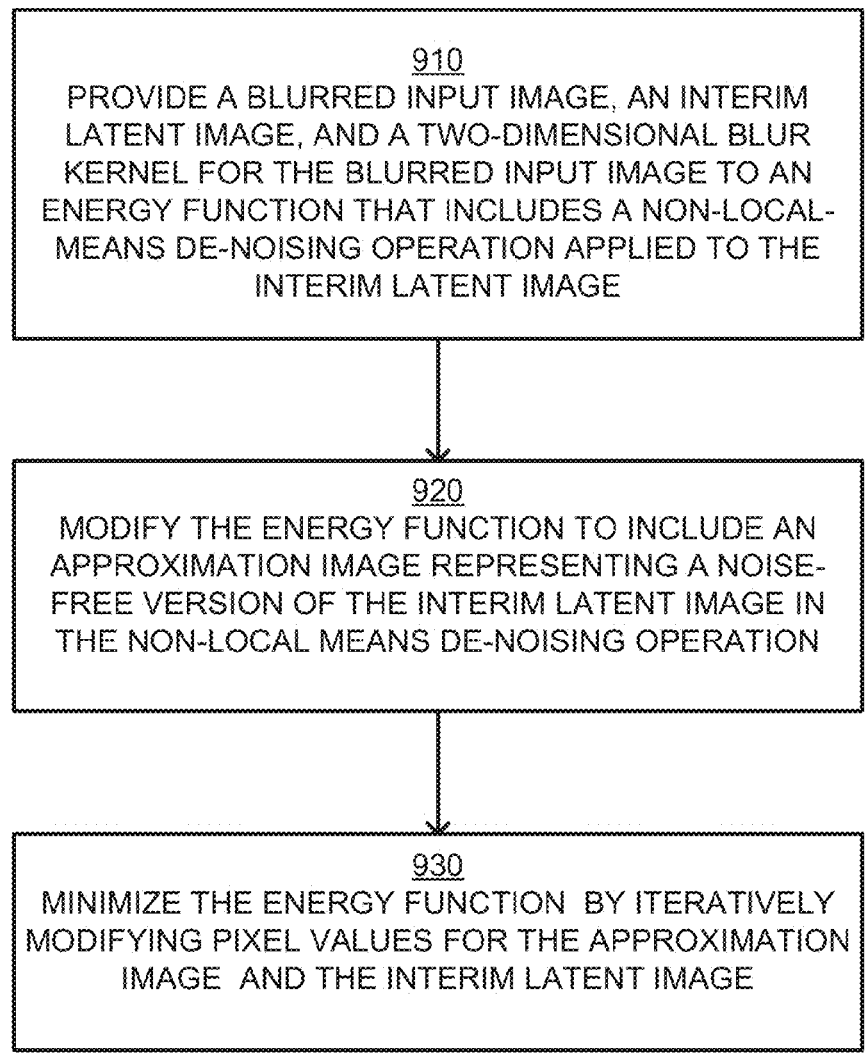
FIG. 9 is a flow chart illustrating an example method 900 for using a noise-aware non-blind de-convolution to generate a de-blurred version of an input image.

FIG. 9 is a flow chart illustrating an example method 900 for using a noise-aware non-blind de-convolution to generate a de-blurred version of an input image. For illustrative purposes, the method 900 is described with reference to the system implementation depicted in FIG. 3. Other implementations, however, are possible. The image manipulation application 116 can generate a high quality, noise-free latent image $l_0$ from an estimated two-dimensional blur kernel $k_0$ and a noisy input image $b_0$.

The method 900 involves providing a blurred input image $b_0$, an interim latent image $l_{0,interim}$, and a two-dimensional blur kernel $k_0$ for the blurred input image $b_0$ to an energy function that includes a non-local means de-noising operation applied to interim latent image $l_{0,interim}$, as shown in block 910. The processor 104 of the computing system 102 can execute the image manipulation application 116 to provide the input image $b_0$, the interim latent image $l_{0,interim}$, and the two-dimensional blur kernel $k_0$ to an energy function. A non-limiting example of an energy function $f_l(l_0)$ is $$f_l(l_{0,interim})=\|l_{0,interim}*k_0-b_0\|^2+w\|l_{0,interim}-\mathrm{NLM}(l_{0,interim})\|^2,$$

where $\mathrm{NLM}(x)$ is a non-local means de-noising operation and $w$ is a balancing weight.

In some embodiments, the method 900 can use an interim latent image $l_{0,interim}$, and a two-dimensional blur kernel $k_0$ for the blurred input image $b_0$ generated by the method 800. In other embodiments, the method 900 can use an interim latent image $l_{0,interim}$, and a two-dimensional blur kernel $k_0$ generated using any suitable process for reliably estimating a two-dimension blur kernel.

The method 900 further involves modifying the energy function $f_l(l_0)$ to include an approximation image $l_0'$ in the non-local means de-noising operation $\mathrm{NLM}(x)$, as shown in block 920. The approximation image $l_0'$ can represent a noise-free version of the interim latent image $l_{0,interim}$. The processor 104 of the computing system 102 can execute the image manipulation application 116 to modify the energy function.

For example, the image manipulation application 116 can substitute the approximation image $l_0'$ into the non-local means de-noising operation NLM(x). The image manipulation application 116 can modify the energy function $f_l(l_o)$ to obtain the function $$f_l'(l_o) = \|l_o * k_o - b_o\|^2 + w_3\|l_o - l_o'\|^2 + w_4\|l_o' - NLM(l_o')\|^2$$

where $w_3$ and $w_4$ represent new balancing weights. Minimizing the third term $\|l_o' - NLM(l_o')\|^2$ can reduce or eliminate noise. The noise-reduction property can be passed to $l_o$ through the second term $\|l_o - l_o'\|^2$.

The method 900 further involves minimizing the energy function $f_l(l_o)$ by iteratively modifying pixel values for the approximation image $l_o'$ and the interim latent image $l_{o,interim}$, as shown in block 930. The image manipulation application 116 can minimize the energy function $f_l'(l_o)$ by iteratively fixing alternating values for $l_o$ and $l_o'$. For each iteration, the energy function $f_l(l_o)$ is quadratic. The energy function $f_l(l_o)$ can be minimized by solving for a linear system. Minimizing the energy function $f_l(l_o)$ can provide a latent image $l_o$ for which noise is eliminated or reduced and which best fits the two-dimensional blur kernel $k_o$ and the input noisy image $b_o$.

The image manipulation application 116 can initialize the minimization process by setting $l_o'$ to zero, wherein each of the pixels for the approximation image $l_o'$ have pixel values of zero (i.e., a black image). Minimizing the energy function $f_l'(l_o)$ can be minimized using a black image for the approximation image approximation image $l_o'(l_o'=0)$. Minimizing the energy function $f_l'(l_o)$ with a zero-value approximation image $l_o'$ can yield an initial latent image $l_o$ that includes both noise and high frequency image structures. The image manipulation application 116 can set the value for the approximation image $l_o'$ to equal the value of the initial latent image $l_o$. The image manipulation application 116 can iteratively perform an alternating minimization process that can gradually reduce the noise in both $l_o'$ and $l_o$. The image manipulation application 116 can cease iteration in response to a stable value for the latent image $l_o$ being generated.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
applying, by an image manipulation application executed by a processing device, a plurality of directional noise filters to an input image to generate a plurality of filtered images, wherein each of the plurality of directional noise filters has a different orientation with respect to the input image;
determining, by the image manipulation application, a plurality of two-dimensional blur kernels for the plurality of filtered images, wherein each of the plurality of two-dimensional blur kernels is determined for a respective filtered image;
generating, by the image manipulation application, a two-dimensional blur kernel for the input image from the plurality of two-dimensional blur kernels for the plurality of filtered images; and
generating, by the image manipulation application, a de-blurred version of the input image by executing a de-blurring algorithm based on the two-dimensional blur kernel for the input image.

2. The method of claim 1, further comprising:
generating an image pyramid, the image pyramid comprising an original-resolution copy of the input image and plurality of reduced-resolution copies of the input image, wherein each of the plurality of reduced-resolution copies has a sequentially decreased resolution with respect to the original-resolution copy;
generating an interim latent image by up-sampling a reduced-resolution copy of the plurality of reduced-resolution copies having the highest resolution of the plurality of reduced-resolution copies, wherein the interim latent image is a modified version of the input image having reduced noise;

iteratively performing the steps of:
applying the plurality of directional noise filters to the input image to generate the plurality of filtered images,
determining the plurality of two-dimensional blur kernels for the plurality of filtered images using the interim latent image,
determining a plurality of Radon transformations, each of the plurality of Radon transformations generated from a corresponding one of the plurality of two-dimensional blur kernels for the plurality of filtered images,
generating the two-dimensional blur kernel for the input image from the plurality of Radon transformations,
determining whether the two-dimensional blur kernel for the input image has converged, and
performing at least one of:
in response to determining that the two-dimensional blur kernel for the input image has not converged, updating the interim latent image based on the two-dimensional blur kernel for the input image, or
in response to determining that the two-dimensional blur kernel for the input image has not converged, ceasing iteration.

3. The method of claim 2, wherein executing the de-blurring algorithm based on the two-dimensional blur kernel for the input image comprises:
providing the input image, the interim latent image, and the two-dimensional blur kernel for the input image to an energy function, wherein the energy function includes a non-local-means denoising operation that is applied to the interim latent image;
modifying the energy function to include an approximation image as an input to the non-local-means denoising operation, the approximation image representing a noise-free version of the interim latent image; and
minimizing the output of the energy function.

4. The method of claim 2, wherein executing the de-blurring algorithm based on the two-dimensional blur kernel for the input image comprises:
providing the input image, the interim latent image, and the two-dimensional blur kernel for the input image to an energy function, wherein the energy function includes a non-local-means denoising operation that is applied to the interim latent image;
substituting an approximation image for the interim latent image in the non-local-means denoising operation, the approximation image representing a noise-free version of the interim latent image; and
minimizing the output of the energy function.

5. The method of claim 1, further comprising:
iteratively performing the steps of:
applying the plurality of directional noise filters to the input image to generate the plurality of filtered images,
determining the plurality of two-dimensional blur kernels for the plurality of filtered images using an interim latent image, wherein the interim latent image is a modified version of the input image having reduced noise and is generated by up-sampling a first reduced-resolution copy of the input image,
determining a plurality of Radon transformations, each of the plurality of Radon transformations generated from a corresponding one of the plurality of two-dimensional blur kernels for the plurality of filtered images,
generating the two-dimensional blur kernel for the input image from the plurality of Radon transformations,
determining whether the two-dimensional blur kernel for the input image has converged, and
performing at least one of:
in response to determining that the two-dimensional blur kernel for the input image has not converged modifying the interim latent image to include one or more pixel values minimizing an energy function that includes the input image, the interim latent image, the two-dimensional blur kernel, and an up-sampled latent image, wherein the up-sampled latent image is generated by up-sampling a second reduced-resolution copy of the input image having a higher resolution that the first reduced-resolution copy; and
in response to determining that the two-dimensional blur kernel for the input image has not converged, ceasing iteration.

6. The method of claim 1, wherein generating the two-dimensional blur kernel for the input image comprises:
generating a plurality of Radon transformations, each of the plurality of Radon transformations corresponding to a respective one of the plurality of two-dimensional blur kernels for the plurality of filtered images; and
applying an inverse radon transform to the plurality of Radon transformations corresponding to the plurality of two-dimensional blur kernels for the plurality of filtered images.

7. The method of claim 1, wherein determining the plurality of two-dimensional blur kernels for the plurality of filtered images comprises, for each two-dimensional blur kernel, projecting the two-dimensional blur kernel in a direction orthogonal to the orientation of the corresponding directional noise filter.

8. A non-transitory computer-readable medium embodying program code executable by a processing device, the non-transitory computer-readable medium comprising:
program code for applying a plurality of directional noise filters to an input image to generate a plurality of filtered images, wherein each of the plurality of directional noise filters has a different orientation with respect to the input image;
program code for determining a plurality of two-dimensional blur kernels for the plurality of filtered images, wherein each of the plurality of two-dimensional blur kernels is determined for a respective filtered image;
program code for generating a two-dimensional blur kernel for the input image from the plurality of two-dimensional blur kernels for the plurality of filtered images; and
program code for generating a de-blurred version of the input image by executing a de-blurring algorithm based on the two-dimensional blur kernel for the input image.

9. The non-transitory computer-readable medium of claim 8, further comprising:
program code for generating an image pyramid, the image pyramid comprising an original-resolution copy of the input image and plurality of reduced-resolution copies of the input image, wherein each of the plurality of reduced-resolution copies has a sequentially decreased resolution with respect to the original-resolution copy;
program code for generating an interim latent image by up-sampling a reduced-resolution copy of the plurality of reduced-resolution copies having the highest resolution of the plurality of reduced-resolution copies, wherein the interim latent image is a modified version of the input image having reduced noise;

program code for iteratively performing the steps of:
applying the plurality of directional noise filters to the input image to generate the plurality of filtered images,
determining the plurality of two-dimensional blur kernels for the plurality of filtered images using the interim latent image,
determining a plurality of Radon transformations, each of the plurality of Radon transformations generated from a corresponding one of the plurality of two-dimensional blur kernels for the plurality of filtered images,
generating the two-dimensional blur kernel for the input image from the plurality of Radon transformations,
determining whether the two-dimensional blur kernel for the input image has converged, and
performing at least one of:
in response to determining that the two-dimensional blur kernel for the input image has not converged, updating the interim latent image based on the two-dimensional blur kernel for the input image, or
in response to determining that the two-dimensional blur kernel for the input image has not converged, ceasing iteration.

10. The non-transitory computer-readable medium of claim 9, wherein the program code for updating the interim latent image comprises:
program code for generating an up-sampled latent image by up-sampling the reduced-resolution copy of the plurality of reduced-resolution copies having the highest resolution;
program code for providing the input image, the interim latent image, the up-sampled latent image, and the two-dimensional blur kernel for the input image to an energy function, wherein the energy function includes a non-local-means denoising operation that is applied to the interim latent image; and
program code for minimizing the energy function.

11. The non-transitory computer-readable medium of claim 9, wherein the program code for executing the de-blurring algorithm based on the two-dimensional blur kernel for the input image comprises:
program code for providing the input image, the interim latent image, and the two-dimensional blur kernel for the input image to an energy function, wherein the energy function includes a non-local-means denoising operation that is applied to the interim latent image;
program code for modifying the energy function to include an approximation image as an input to the non-local-means denoising operation, the approximation image representing a noise-free version of the interim latent image; and
program code for minimizing the output of the energy function.

12. The non-transitory computer-readable medium of claim 8, wherein the program code for generating the two-dimensional blur kernel for the input image comprises:
program code for generating a plurality of Radon transformations, each of the plurality of Radon transformations corresponding to a respective one of the plurality of two-dimensional blur kernels for the plurality of filtered images; and
program code for applying an inverse radon transform to the plurality of Radon transformations corresponding to the plurality of two-dimensional blur kernels.

13. The non-transitory computer-readable medium of claim 8, wherein the program code for determining the plurality of two-dimensional blur kernels for the plurality of filtered images comprises program code for, projecting each two-dimensional blur kernel in a direction orthogonal to the orientation of the corresponding directional noise filter.

14. A system comprising:
a processor configured to execute instructions stored in a non-transitory computer-readable medium;
wherein the instructions comprise an image manipulation application configured to perform operations comprising:
applying a plurality of directional noise filters to an input image to generate a plurality of filtered images, wherein each of the plurality of directional noise filters has a different orientation with respect to the input image,
determining a plurality of two-dimensional blur kernels for the plurality of filtered images, wherein each of the plurality of two-dimensional blur kernels is determined for a respective filtered image,
generating a two-dimensional blur kernel for the input image from the plurality of two-dimensional blur kernels for the plurality of filtered images, and
generating a de-blurred version of the input image by executing a de-blurring algorithm based on the two-dimensional blur kernel for the input image.

15. The system of claim 14, further comprising an imaging device configured to record the input image, wherein the processor is configured to receive the input image from the imaging device.

16. The system of claim 14, wherein the image manipulation application is configured to generate the two-dimensional blur kernel for the input image by:
generating a plurality of Radon transformations, each of the plurality of Radon transformations corresponding to a respective one of the plurality of two-dimensional blur kernels for the plurality of filtered images; and
applying an inverse radon transform to the plurality of Radon transformations corresponding to the plurality of two-dimensional blur kernels.

17. The system of claim 14, wherein the image manipulation application is further configured to perform additional operations comprising
generating an image pyramid, the image pyramid comprising an original-resolution copy of the input image and plurality of reduced-resolution copies of the input image, wherein each of the plurality of reduced-resolution copies has a sequentially decreased resolution with respect to the original-resolution copy;
generating an interim latent image by up-sampling a reduced-resolution copy of the plurality of reduced-resolution copies having the highest resolution of the plurality of reduced-resolution copies, wherein the interim latent image is a modified version of the input image having reduced noise;
iteratively performing the steps of:
applying the plurality of directional noise filters to the input image to generate the plurality of filtered images,
determining the plurality of two-dimensional blur kernels for the plurality of filtered images using the interim latent image,
determining a plurality of Radon transformations, each of the plurality of Radon transformations generated from a corresponding one of the plurality of two-dimensional blur kernels for the plurality of filtered images, generating the two-dimensional blur kernel for the input image from the plurality of Radon transformations, determining whether the two-dimensional blur kernel for the input image has converged, and performing at least one of:
- in response to determining that the two-dimensional blur kernel for the input image has not converged, updating the interim latent image based on the two-dimensional blur kernel for the input image, or
- in response to determining that the two-dimensional blur kernel for the input image has not converged, ceasing iteration.

* * * * *

UNITED STATES PATENT AND TRADEMARK OFFICE
CERTIFICATE OF CORRECTION

PATENT NO. : 8,867,856 B2  
APPLICATION NO. : 13/674263  
DATED : October 21, 2014  
INVENTOR(S) : Jue Wang, Sunghyun Cho and Lin Zhong Page 1 of 1

It is certified that error appears in the above-identified patent and that said Letters Patent is hereby corrected as shown below:

In the Claims

Column 17, Claim 12, Line 57

Delete "Thenon-transitory"

Insert --The non-transitory--

Signed and Sealed this  
Third Day of March, 2015

Michelle K. Lee  
*Deputy Director of the United States Patent and Trademark Office*